US012500353B2

(12) United States Patent
Liu

(10) Patent No.: US 12,500,353 B2
(45) Date of Patent: Dec. 16, 2025

(54) FEEDING STRUCTURE FOR ANTENNA ARRAY, ANTENNA ARRAY, AND NETWORK NODE

(71) Applicant: Telefonaktiebolaget LM Ericsson (publ), Stockholm (SE)

(72) Inventor: Haitao Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 18/039,385

(22) PCT Filed: Dec. 10, 2020

(86) PCT No.: PCT/CN2020/135326
§ 371 (c)(1),
(2) Date: May 30, 2023

(87) PCT Pub. No.: WO2022/120736
PCT Pub. Date: Jun. 16, 2022

(65) Prior Publication Data
US 2024/0006776 A1 Jan. 4, 2024

(51) Int. Cl.
*H01Q 21/24* (2006.01)
*H01Q 15/24* (2006.01)
*H01Q 21/00* (2006.01)

(52) U.S. Cl.
CPC ........... *H01Q 21/24* (2013.01); *H01Q 15/242* (2013.01); *H01Q 21/0006* (2013.01)

(58) Field of Classification Search
CPC ... H01Q 21/24; H01Q 15/242; H01Q 21/0006
See application file for complete search history.

(56) References Cited

U.S. PATENT DOCUMENTS 6,043,790 A * 3/2000 Derneryd ................. H01Q 3/26 342/368
8,063,832 B1 * 11/2011 Weller ................... H01Q 21/08 343/824

(Continued)

FOREIGN PATENT DOCUMENTS

CN 101578737 A 11/2009
CN 210111047 U 2/2020

(Continued)

OTHER PUBLICATIONS

International Search Report and Written Opinion of the International Searching Authority, PCT/CN2020/135326, mailed Aug. 26, 2021, 7 pages.

*Primary Examiner* — Hai V Tran
(74) *Attorney, Agent, or Firm* — Sage Patent Group

(57) ABSTRACT

The present disclosure relates to a feeding structure for an antenna array, an antenna array, and a network node. The antenna array may include a plurality of subarrays each with at least one antenna element. The feeding structure may include at least one transmitting branch and at least one receiving branch for a subarray of the plurality of subarrays. The at least one transmitting branch and the at least one receiving branch may be arranged separately. Thus, feeding structure with specific transmitting branches for improving phase tuning density may be provided by embodiments. The feeding structure for the antenna array may include asymmetrically separated transmitting signal path and receiving signal path. The polarization type of the transmitting can be individually controlled while a pair of orthogonal polarization are realized for receiving. The phase control density can be separately controlled for transmitting and receiving as demand.

20 Claims, 7 Drawing Sheets

(56) References Cited

U.S. PATENT DOCUMENTS

| | | | | |
|---|---|---|---|---|
| 9,391,375 | B1 * | 7/2016 | Bales | H01Q 21/064 |
| 10,211,529 | B2 | 2/2019 | Haskell et al. | |
| 11,165,165 | B2 * | 11/2021 | Chen | H04B 1/0053 |
| 11,329,379 | B2 * | 5/2022 | Shibata | H01Q 5/307 |
| 2010/0123619 | A1 * | 5/2010 | Shijo | H01Q 21/061<br>343/893 |

FOREIGN PATENT DOCUMENTS

| | | | |
|---|---|---|---|
| WO | 2019179617 | A1 | 9/2019 |
| WO | 2020132585 | A1 | 6/2020 |

* cited by examiner (1) without proposed feeding structure in embodiments (2) with proposed feeding structure in embodiments

FEEDING STRUCTURE FOR ANTENNA ARRAY, ANTENNA ARRAY, AND NETWORK NODE

CROSS REFERENCE TO RELATED APPLICATIONS

This application is a 35 U.S.C. § 371 national stage application of PCT International Application No. PCT/CN2020/135326 filed on Dec. 10, 2020, the disclosure and content of which is incorporated by reference herein in its entirety.

TECHNICAL FIELD

The present disclosure relates generally to the wireless communication technology, and in particular, to a feeding structure for antenna array, an antenna array, and a network node.

BACKGROUND

This section introduces aspects that may facilitate better understanding of the present disclosure. Accordingly, the statements of this section are to be read in this light and are not to be understood as admissions about what is in the prior art or what is not in the prior art.

In wireless communication devices (terminal device, or network node/device, etc.), the antenna array with a plurality of antenna elements are used more and more widely. The number of the antenna elements may continuously increase.

However, the number of transmission/reception channels may remain the same or even be reduced, due to cost and/or space requirements. That is, more antenna elements may be coupled to the same transmission/reception channel via a feeding structure. The antenna elements coupled to the same channel may share the same "tuned phase", and thus, a phase tuning density decreases.

The decreased phase tuning density may affect the beam of the antenna. For example, the side-lobe level may increase. Therefore, improvement of phase tuning in antenna array is desired.

SUMMARY

Certain aspects of the present disclosure and their embodiments may provide solutions to these or other challenges. There are, proposed herein, various embodiments which address one or more of the issues disclosed herein.

A maximum phase tuning density of an antenna array may be represented as "1", which means the phase was tuned on every antenna element (AE). For example, when 4×1 antenna elements are coupled as one subarray, the phase tuning density will change to "¼", or when 6×1 antenna elements are coupled as one subarray, the phase tuning density will change to "⅙". In such situation, the side-lobe level will become bigger, and upper-side-lobe-suppression (upper-SLS) ratio will become smaller, and the sweeping range will become narrower.

A first aspect of the present disclosure provides a feeding structure for antenna array. The antenna array may comprise a plurality of subarrays each with at least one antenna element. The feeding structure may comprise at least one transmitting branch and at least one receiving branch for a subarray of the plurality of subarrays. The at least one transmitting branch and the at least one receiving branch may be arranged separately.

In embodiments of the present disclosure, the feeding structure for antenna array may comprise a first transmitting port; a first transmitting branch coupled from the first transmitting port; and a second transmitting branch coupled from the first transmitting port. The first transmitting branch may be coupled to a first polarization part of a first antenna element to excite a first polarization from the first antenna element, and may be coupled to a first polarization part of a second antenna element to excite the first polarization from the second antenna element. The second transmitting branch may be coupled to a second polarization part of the first antenna element to excite a second polarization from the first antenna element, and may be coupled to a second polarization part of the second antenna element to excite the second polarization from the second antenna element. The first polarization from the first antenna element and the second polarization from the first antenna element may be combined to form a third polarization of the first antenna element, and the first polarization from the second antenna element and the second polarization from the second antenna element may be combined to form a third polarization of the second antenna element.

In embodiments of the present disclosure, the feeding structure for antenna array may comprise a first receiving branch coupled from the first polarization part of the first antenna element, and the first polarization part of the second antenna element; and a second receiving branch coupled from the second polarization part of the first antenna element, the second polarization part of the second antenna element. As to receiving, the first antenna element and the second antenna element may be bipolarization antenna elements.

In embodiments of the present disclosure, a first circulator may be coupled between the first transmitting branch, the first receiving branch, and first polarization parts of the first and second antenna elements, and a second circulator may be coupled between the second transmitting branch, the second receiving branch, and second polarization parts of the first and second antenna elements.

In embodiments of the present disclosure, the feeding structure for antenna array may comprise a second transmitting port, a third transmitting branch coupled to the second transmitting port, and a fourth transmitting branch coupled to the second transmitting port. The third transmitting branch may be coupled to a first polarization part of a third antenna element to excite the first polarization from the third antenna element, and may be coupled to a first polarization part of a fourth antenna element to excite the first polarization from the fourth antenna element. The fourth transmitting branch may be coupled to a second polarization part of the third antenna element to excite the second polarization from the third antenna element, and may be coupled to a second polarization part of the fourth antenna element to excite the second polarization from the fourth antenna element. The first polarization from the third antenna element and the second polarization from the third antenna element are combined to form a third polarization of the third antenna element, and the first polarization from the fourth antenna element and the second polarization from the fourth antenna element are combined to form a third polarization of the fourth antenna element.

In embodiments of the present disclosure, the feeding structure for antenna array may comprise a third receiving branch coupled from the first polarization part of the third antenna element, and the first polarization part of the fourth antenna element; and a fourth receiving branch coupled from the second polarization part of the third antenna element, and the second polarization part of the fourth antenna element. As to receiving, the third antenna element and the fourth antenna element are bipolarization antenna elements.

In embodiments of the present disclosure, a third circulator may be coupled between the third transmitting branch, the third receiving branch, and first polarization parts of the third and fourth antenna elements, and a fourth circulator may be coupled between the fourth transmitting branch, the fourth receiving branch, and second polarization parts of the third and fourth antenna elements.

In embodiments of the present disclosure, the first receiving branch and the third receiving branch may be coupled to a first receiving port; and the second receiving branch and the fourth receiving branch may be coupled to a second receiving port.

In embodiments of the present disclosure, a first phase shifter may be arranged in the first receiving branch; and a second phase shifter may be arranged in the second receiving branch.

In embodiments of the present disclosure, the first transmitting branch may be further coupled to a first polarization part of a fifth antenna element to excite the first polarization from the fifth antenna element; and the second transmitting branch may be further coupled to a second polarization part of the fifth antenna element to excite the second polarization from the sixth antenna element.

In embodiments of the present disclosure, the first polarization and the second polarization may be orthogonal; and/or the first polarization and the second polarization may be the same.

A second aspect of the present disclosure provides an antenna array. The antenna array may comprise a plurality of antenna elements, and the feeding structure for antenna array according to any of embodiments described above.

In embodiments of the present disclosure, the antenna array comprises a plurality of subarrays each with 4×1 antenna elements.

In embodiments of the present disclosure, the antenna array comprises a plurality of subarrays each with 5×1 or 6×1 antenna elements.

A third aspect of the present disclosure provides a network node. The network node may comprise the antenna array according to any of embodiments described above.

According to embodiments of the present disclosure, a feeding structure with specific transmission feeding branches may be provided. Therefore, a phase tuning density of transmission channels may be adjusted independently with reception channels. This is advantageous for improving the phase tuning density.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
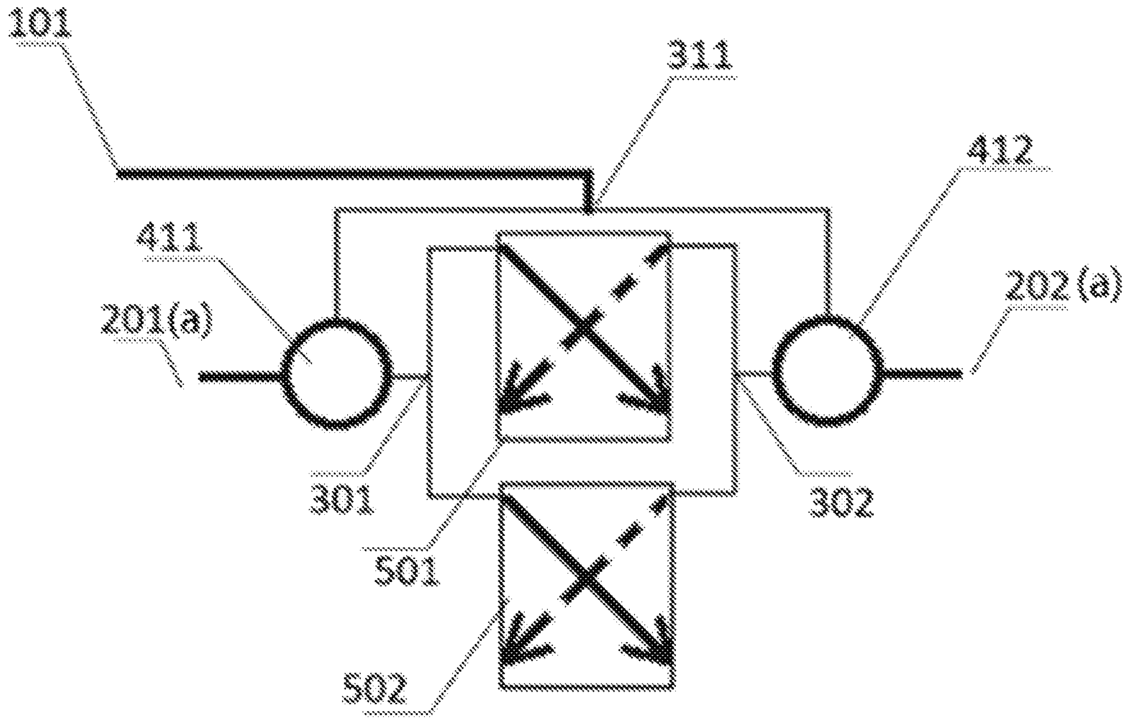
FIG. 1 is an exemplary diagram showing an exemplary feeding structure for antenna array, according to embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms “first”, “second” and so forth refer to different elements. The singular forms “a” and “an” are intended to include the plural forms as well, unless the context clearly indicates otherwise. The terms “comprises”, “comprising”, “has”, “having”, “includes” and/or “including” as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the term "network" or "communication network" refers to a network following any suitable wireless communication standards. For example, the wireless communication standards may comprise 5$^{th}$ generation (5G), new radio (NR), 4$^{th}$ generation (4G), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network node" used herein refers to a network device or network entity or network function or any other devices (physical or virtual) in a communication network. For example, the network node in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

For example, in a 32Tx/Rx (Transmitting/Receiving) AAS (Advanced Antenna System) over 128AE (Antenna Element) platform, the subarray scale is 4×1 AE. In this setup, every 4 AE share one "tuned phase". Or in other words, the phase tuning density is "¼". In current design, the Transmitting (Tx) and Receiving (Rx) are symmetric, and the phase tuning density is "¼" for both the Tx and Rx.

The larger phase tuning density, the smaller side-lobe level is, and the larger upper-side-lobe-suppression (upper-SLS) ratio is.

For 32Tx/Rx AAS over 128AE platform, the antenna gain and upper-side-lobe-suppression (upper-SLS) ratio reports a conflict.

In order to increase the antenna gain, the vertical size of the antenna array has to be enlarged. But the upper side-lobe level increased simultaneously and exceed the requirement, when the antenna's vertical size increased.

The antenna gain is the platform's first priority requirement, which must be satisfied. Since there is no other option to improve the antenna gain besides enlarge the vertical size of the antenna array, applicable techniques must be developed for reducing the upper-SLS for 32Tx/Rx AAS over 128AE platform.

It is desired to improve the phase tuning density to reduce the upper side-lobe level, while remaining the antenna's vertical size/gain.

In embodiments of the present disclosure, the antenna array may comprise a plurality of subarrays each with at least one antenna element (i.e., with at least 1×1 antenna element). The feeding structure may comprise at least one transmitting branch and at least one receiving branch for a subarray of the plurality of subarrays. The at least one transmitting branch and the at least one receiving branch may be arranged separately.

Thus, the feeding structure for the antenna array may comprise asymmetrically separated transmitting signal path and receiving signal path. The polarization type of the transmitting can be individually controlled while a pair of orthogonal polarization are realized for receiving. The phase control density can be separately controlled for transmitting and receiving as demand.

In embodiments of the present disclosure, a subarray may correspond to an asymmetric feed network, whose transmitting branch and receiving branch can be controlled separately and individually. And thus, the polarization of transmitting and receiving can be configure separately and individually. The phase control density can be allocated separately and individually for Tx and Rx. The DBF (digital beam forming) and ABF (analog beam forming) can be assigned to the Tx and Rx separately and individually. The subarray may have a scale of (n×1), where n is integer number from 1 and a 1×1 subarray equals to an Antenna Element.

Without limitation, further detailed exemplary embodiments will be described.

FIG. 1 is an exemplary diagram showing an exemplary feeding structure for antenna array, according to embodiments of the present disclosure.

As show in FIG. 1, the feeding structure for antenna array may comprise a first transmitting port 101; a first transmitting branch coupled from the first transmitting port 101; and a second transmitting branch coupled from the first transmitting port 101. The first transmitting branch may be coupled to a first polarization part of a first antenna element 501 to excite a first polarization from the first antenna element 501, and may be coupled to a first polarization part of a second antenna element 502 to excite the first polarization from the second antenna element 502. The second transmitting branch may be coupled to a second polarization part of the first antenna element 501 to excite a second polarization from the first antenna element 501, and may be coupled to a second polarization part of the second antenna element 502 to excite the second polarization from the second antenna element 502. The first polarization from the first antenna element and the second polarization from the first antenna element may be combined to form a third polarization of the first antenna element, and the first polarization from the second antenna element and the second polarization from the second antenna element may be combined to form the third polarization of the second antenna element. The specific property of the third polarization may be based at least on the signals simultaneously fed to the first and second polarization parts.

This is, when the first polarization part, and the second polarization part are excited individually, bipolarization antenna elements for transmitting may be achieved. While in the embodiments of the present disclosure, the first polarization part, and the second polarization part may be excited together, to achieved antenna elements transmitting signals with a single polarization (third polarization).

The specific structure of polarization part is not limited. The polarization part may comprise any type of radiation component with different structures (such as microstrip, rod, etc.) and/or different materials (any kind of applicable metal, etc.).

The first polarization is shown in solid line, and the second polarization is represented by dashed line.

According to embodiments of the present disclosure, a feeding structure with specific transmission feeding branches may be provided. Particularly, a transmitting port may be simultaneously coupled to a first polarization part and a second polarization part of a first antenna element, and a first polarization part and a second polarization part of a second antenna element. Therefore, a phase tuning density of transmission channels may be adjusted independently with reception channels. This is advantageous for improving the phase tuning density.

In embodiments of the present disclosure, the feeding structure for antenna array may comprise a first receiving branch 201(*a*) coupled from the first polarization part of the first antenna element 501, and the first polarization part of the second antenna element 502; and a second receiving branch 202(*a*) coupled from the second polarization part of the first antenna element 501, the second polarization part of the second antenna element 502. As to receiving, the first antenna element and the second antenna element may be bipolarization antenna elements.

As shown in FIG. 1, a specific asymmetric structure for the transmission channel and the reception channel is provided. Therefore, it is possible to improve the phase tuning density of the transmission channel, while remain the phase tuning density of the reception channel. Thus, the upper-SLS ratio may be improved without reducing the antenna gain.

In embodiments of the present disclosure, a first circulator 411 may be coupled between the first transmitting branch, the first receiving branch, and first polarization parts of the first and second antenna elements, and a second circulator 412 may be coupled between the second transmitting branch, the second receiving branch, and second polarization parts of the first and second antenna elements.

According to the embodiments of the present disclosure, the circulator may function as an isolator of the transmission channel and the reception channel. For example, the signals from the first transmitting branch will go to the antenna elements 501, 502 through the first circulator 411, but not to the first receiving branch 201(*a*). The signals from the antenna elements 501, 502 will go to the first receiving branch 201(*a*), but not to the first transmitting branch.

According to the embodiments of the present disclosure, one transmitting port sees two orthogonal polarization parts of an antenna element simultaneously. For the pair of orthogonal polarization parts, two receiving ports are required for each polarization part individually. For the first transmitting port (101), from which a first and a second transmitting branches are coupled. The first transmitting branch excites a first polarization from antenna elements (501, 502) and simultaneously, the second transmitting branch excites a second polarization from antenna elements (501, 502). The first polarization from the antenna elements (501, 502) and the second polarization from the antenna elements (501, 502) are combined to form a third polarization. Thus, feeding structure with specific transmitting branches for improving phase tuning density may be provided by embodiments. When receiving, the first polarization from the antenna elements (501, 502) coupled to a first output branch 201(*a*), and the second polarization from the antenna elements (501, 502) coupled to a second output branch 202(*a*).

Figure 2:
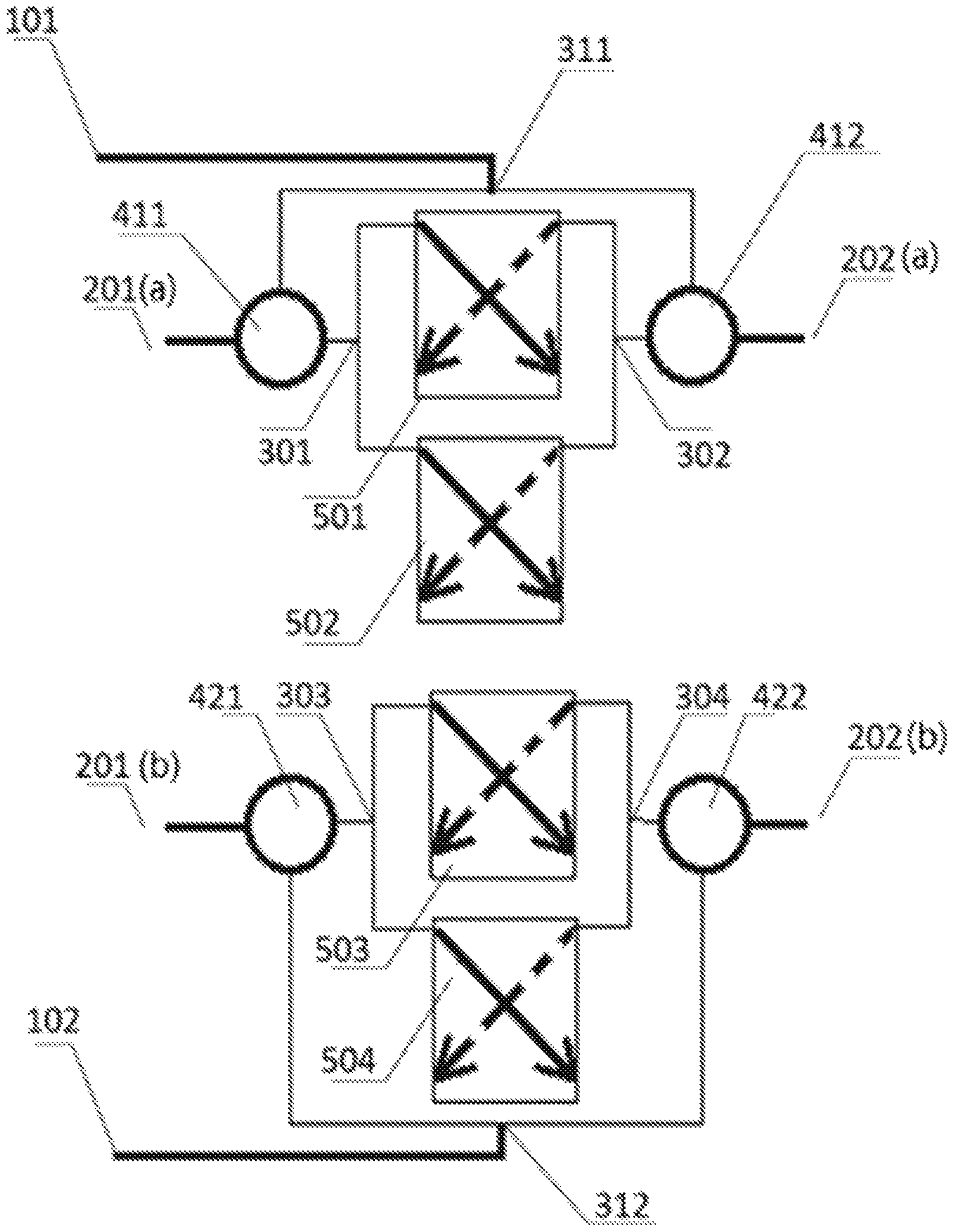
FIG. 2 is an exemplary diagram showing further portion of the exemplary feeding structure for antenna array, according to embodiments of the present disclosure.

FIG. 2 is an exemplary diagram showing further portion of the exemplary feeding structure for antenna array, according to embodiments of the present disclosure.

As shown in FIG. 2, the feeding structure for antenna array may comprise a second transmitting port 102, a third transmitting branch coupled from the second transmitting port 102, and a fourth transmitting branch coupled from the second transmitting port 102. The third transmitting branch may be coupled to a first polarization part of a third antenna element 503 to excite the first polarization from the third antenna element 503, and may be coupled to a first polarization part of a fourth antenna element 504 to excite the first polarization from the fourth antenna element 504. The fourth transmitting branch may be coupled to a second polarization part of the third antenna element 503 to excite the second polarization from the third antenna element 503, and may be coupled to a second polarization part of the fourth antenna element 504 to excite the second polarization from the fourth antenna element 504. The first polarization from the third antenna element 503 and the second polarization from the third antenna element 503 are combined to form a third polarization of the third antenna element 503, and the first polarization from the fourth antenna element 504 and the second polarization from the fourth antenna element 504 are combined to form the third polarization of the fourth antenna element 504.

In embodiments of the present disclosure, the feeding structure for antenna array may comprise a third receiving branch 201(*b*) coupled from the first polarization part of the third antenna element 503, and the first polarization part of the fourth antenna element 504, and a fourth receiving branch 202(*b*) coupled from the second polarization part of the third antenna element 503, and the second polarization part of the fourth antenna element 504. As to receiving, the third antenna element 503 and the fourth antenna element 504 are bipolarization antenna elements.

In embodiments of the present disclosure, a third circulator 421 may be coupled between the third transmitting branch, the third receiving branch, and first polarization parts of the third and fourth antenna elements, and a fourth circulator 422 may be coupled between the fourth transmitting branch, the fourth receiving branch, and second polarization parts of the third and fourth antenna elements.

Figure 3:
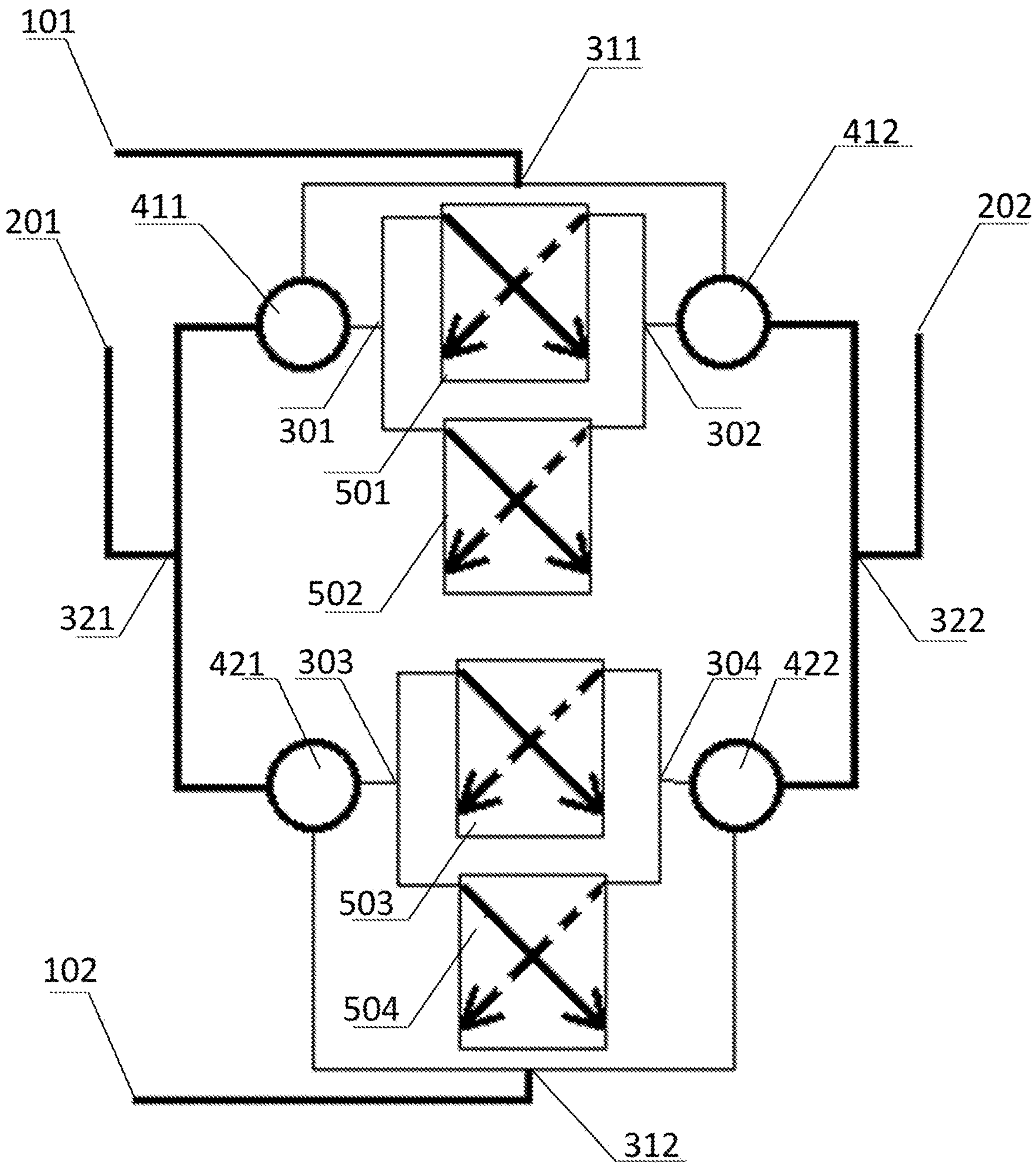
FIG. 3 is an exemplary diagram showing another exemplary feeding structure for antenna array, according to embodiments of the present disclosure.

FIG. 3 is an exemplary diagram showing another exemplary feeding structure for antenna array, according to embodiments of the present disclosure.

As shown in FIG. 3, the first receiving branch and the third receiving branch may be coupled to the first receiving port 201; and the second receiving branch and the fourth receiving branch may be coupled to the second receiving port 202.

As shown in FIG. 3, an antenna array is fed by an Tx & Rx asymmetric feeding structure (or named as feeding network). The Tx and Rx are feeding the antenna array through an asymmetric feeding network.

For Tx channels, there are two input ports, which feed signals to the antenna elements and are marked as 101 and 102 for Tx channel-1 and Tx channel-2 respectively. Each Tx channel are connected with 2 AE (Antenna Element).

For Rx channels, there are two output ports, which receive signals from the antenna elements and are marked as 201 and 202 for Rx channel 1 and Rx channel 2 respectively. Each Rx channel are connected with 4 AE.

Such feeding structure is a particularly improved manner, while in traditional Tx & Rx symmetry feeding network, the Tx and Rx should be connected to AE with same quantity.

In FIG. 3, each Tx channel corresponds to 2×1 array (namely sub-subarray), and every Rx channel corresponds to 4×1 array (namely subarray).

As illustrated in FIG. 3, the solid-lined arrow and the dash-lined arrow in the AE (501, 502, 503 and 504) represents a pair of orthogonal polarization generated by each AE. If the polarization represented by solid-line arrow is named +45 polarization, the polarization represented by dash-line arrow may be named as −45 polarization accordingly.

The signal from Tx channel-1 with input port 101 is firstly divided into two sub-streams (Tx-1-R and Tx-1-L) at the point of 311 along the first transmitting branch and the second transmitting branch respectively. The sub-stream Tx-1-R is fed to the circulator 411 and outputs at the point of 301. At the point of 301, the sub-stream Tx-1-R is divided again and fed to the AE 501 and 502 accordingly. According to the connection given in FIG. 3, the sub-stream Tx-1-R excites the [+45] polarization from the 2×1 sub-subarray composing of AE 501 and AE 502. The sub-stream Tx-1-L is fed to the circulator 412 and outputs at the point of 302. At the point of 302, the sub-stream Tx-1-L is divided again and fed to the AE 501 and 502 accordingly. According to the connection given in FIG. 3, the sub-stream Tx-1-L excites the [−45] polarization from the 2×1 sub-subarray composing of AE 501 and AE 502.

The signal from Tx channel-2 with input port 102 is firstly divided into two sub-streams (Tx-2-R and Tx-2-L) at the point of 312. The sub-stream Tx-2-R is fed to the circulator 421 and outputs at the point of 303. At the point of 303, the sub-stream Tx-2-R is divided again and fed to the AE 503 and 504 accordingly. According to the connection given in FIG. 3, the sub-stream Tx-2-R excites the [+45] polarization from the 2×1 sub-subarray composing of AE 503 and AE 504. The sub-stream Tx-2-L is fed to the circulator 422 and outputs at the point of 304. At the point of 304, the sub-stream Tx-2-L is divided again and fed to the AE 503 and 504 accordingly. According to the connection given in FIG. 3, the sub-stream Tx-2-L excites the [−45] polarization from the 2×1 sub-subarray composing of AE 503 and AE 504.

In embodiments, for each Tx, the phase tuning density is "½", which is larger than the "¼" phase tuning density reported by current 32 Tx/Rx Platform. Since The larger phase tuning density, the smaller side-lobe level, the design proposed in this embodiment can achieve much smaller upper side-lobe lever when comparing with current Platform. Further, due to the larger phase tuning density, the upper-side-lobe-suppression (upper-SLS) ratio is also larger. The design proposed in embodiments can achieve much larger upper-SLS ratio when comparing with current 32 Tx/Rx Platform.

When receiving, the [+45] polarized signal from AE 501 and AE 502 are combined at point 301 and fed into circulator 411. The [+45] polarized signal from AE 503 and AE 504 are combined at point 303 and fed into circulator 421. The signal from circulator 411 and circulator 421 are combined at point 321 and to form the received signal Rx-1. The Rx-1 outputs at the output port 201.

The [−45] polarized signal from AE 501 and AE 502 are combined at point 302 and fed into circulator 412. The [−45] polarized signal from AE 503 and AE 504 are combined at point 304 and fed into circulator 422. The signal from circulator 412 and circulator 422 are combined at point 322 and to form the received signal Rx-2. The Rx-2 outputs at the output port 202.

In embodiments, for each Rx, the phase tuning density is "¼", which has been kept as same as current 32 Tx/Rx Platform. This feature makes sure the receiving performance can be kept as well as current 32 Tx/Rx Platform and will introduce the minimum deviation impact on algorithm.

Figure 4:
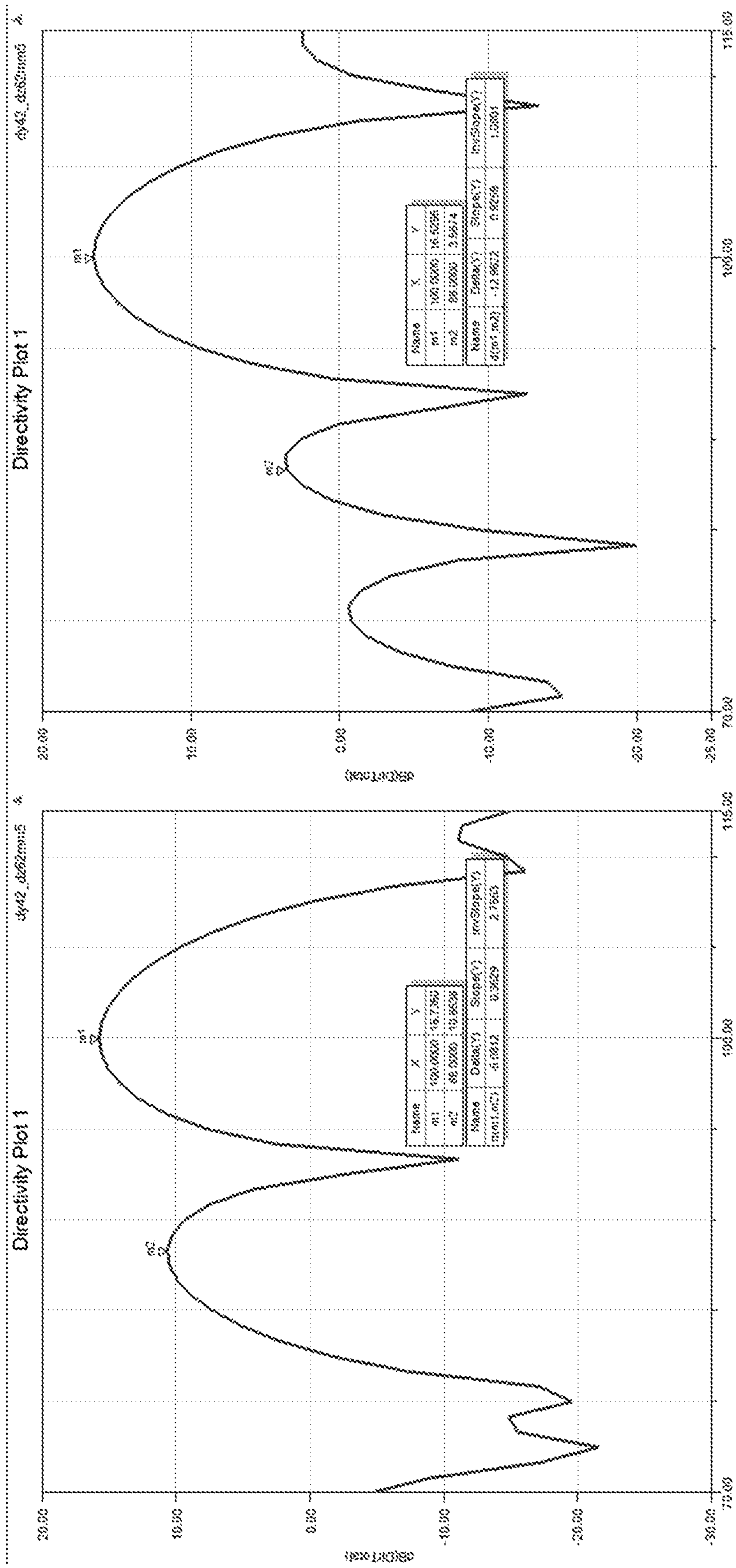
FIG. 4 is an exemplary diagram showing an improvement based on the exemplary feeding structure for antenna array, according to embodiments of the present disclosure.

FIG. 4 is an exemplary diagram showing an improvement of the exemplary feeding structure for antenna array, according to embodiments of the present disclosure.

As shown in FIG. 4, after utilizing the feeding structure (such as that shown in FIG. 3) according to embodiments of the present disclosure, the side lobe level indicated by m2 in vertical direction is reduced while the main lobe level indicated by m1 is remained. Thus, the upper-SLS ratio can be increased to satisfy practical requirement.

Figure 5:
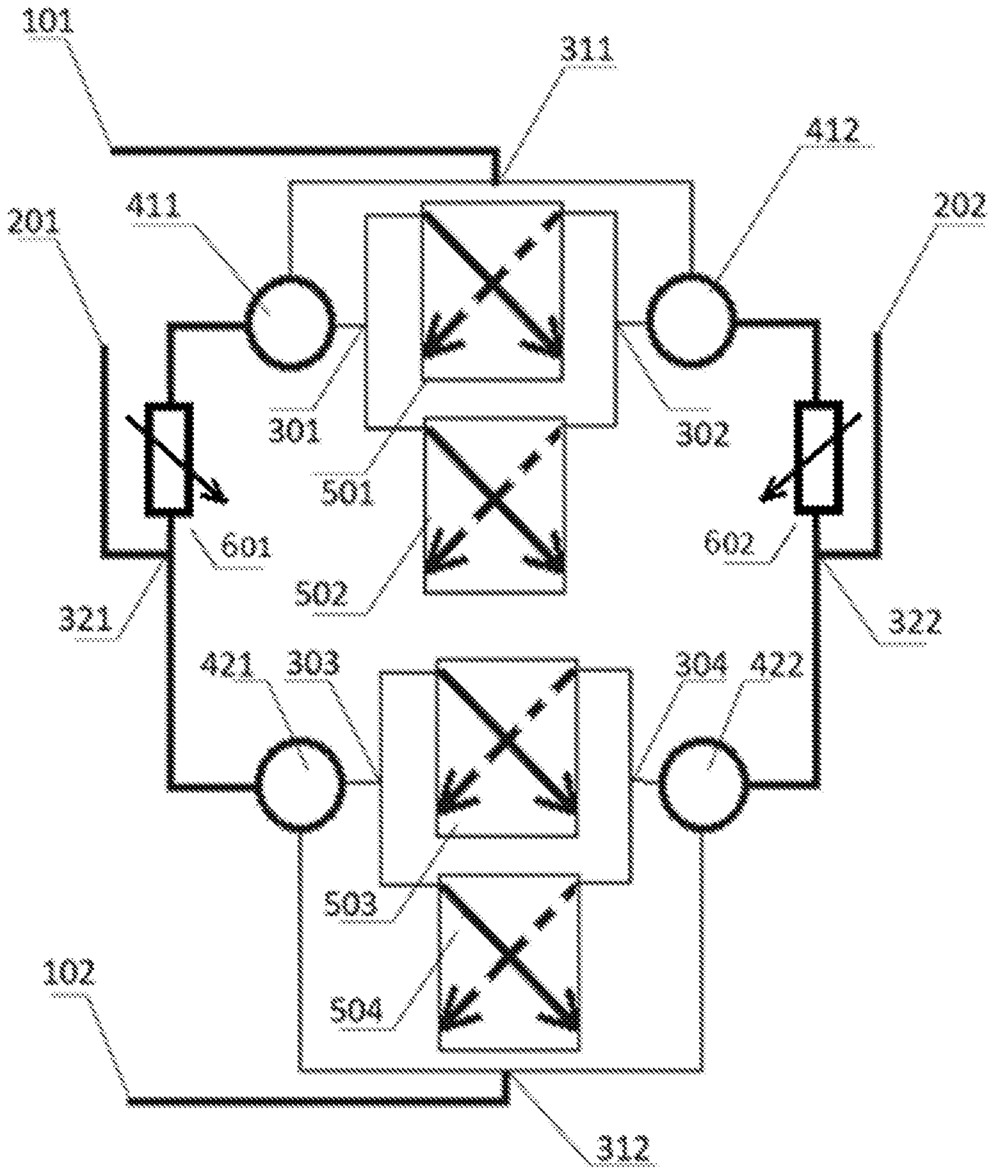
FIG. 5 is an exemplary diagram showing another exemplary feeding structure for antenna array, according to embodiments of the present disclosure.

FIG. 5 is an exemplary diagram showing another exemplary feeding structure for antenna array, according to embodiments of the present disclosure.

As shown in FIG. 5, a first phase shifter 601 may be arranged in the first receiving branch; and a second phase shifter 602 may be arranged in the second receiving branch.

The phase shifters may be utilized to adjust the phase of signals passing through the first receiving branch, or the second receiving branch, so as to facilitate the combination of received signals, i.e. the direction of the incoming signal at which reports the best receiving gain can be controlled. Thus, the uplink covering area can be reconfigured on the demand of operator.

Figure 6:
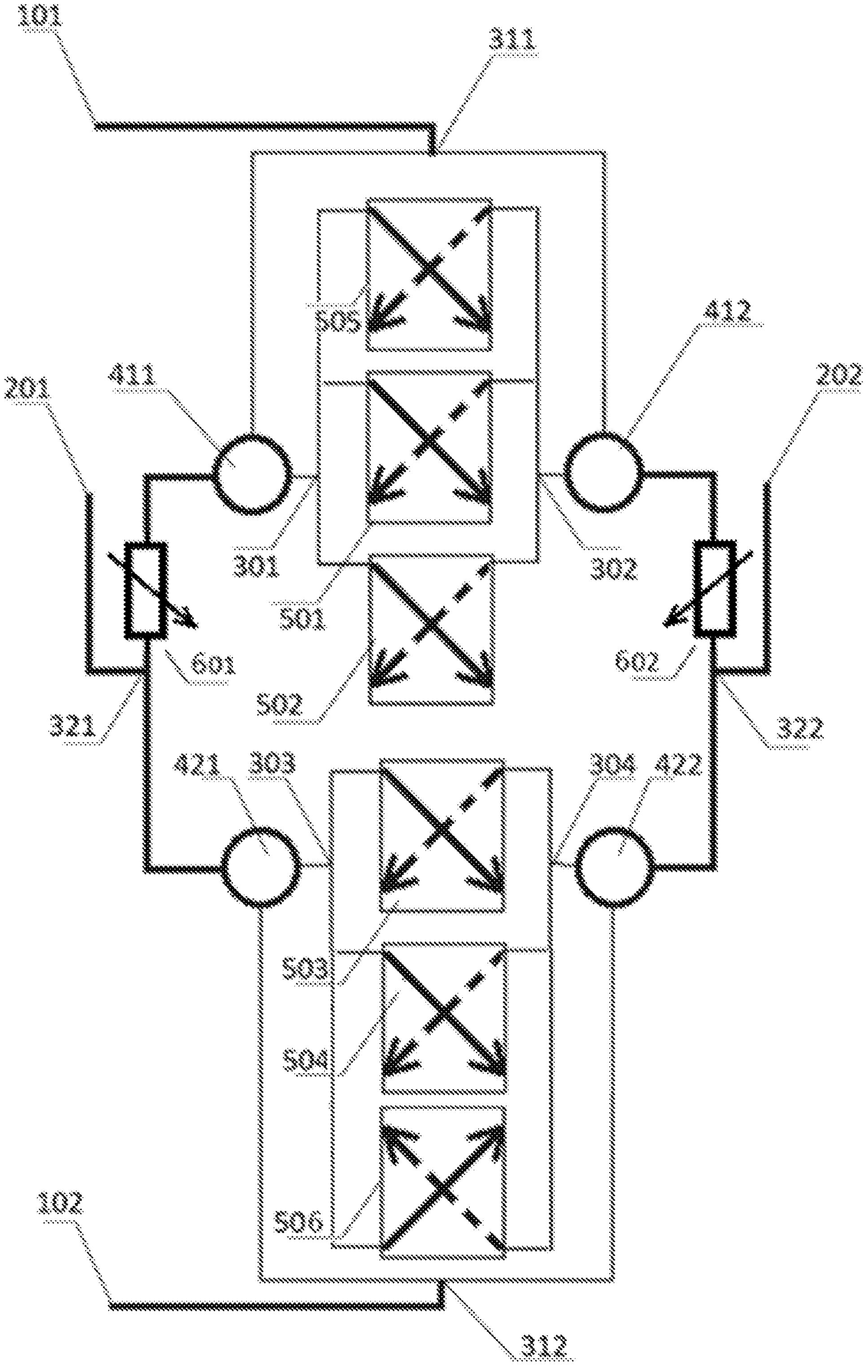
FIG. 6 is an exemplary diagram showing another exemplary feeding structure for antenna array, according to embodiments of the present disclosure.

FIG. 6 is an exemplary diagram showing another exemplary feeding structure for antenna array, according to embodiments of the present disclosure.

As shown in FIG. 6, the first transmitting branch may be further coupled to a first polarization part of a fifth antenna element 505 to excite the first polarization from the fifth antenna element 505; and the second transmitting branch may be further coupled to a second polarization part of the fifth antenna element 505 to excite the second polarization from the fifth antenna element 505.

Further, the third transmitting branch may be further coupled to a first polarization part of a sixth antenna element 506; and the fourth transmitting branch may be further coupled to a second polarization part of the sixth antenna element 506.

Correspondingly, the first receiving port 201 may be further coupled to first polarization parts of the fifth antenna element 505 and the sixth antenna element 506; and the second receiving port 202 may be further coupled to second polarization parts of the fifth antenna element 505 and the sixth antenna element 506.

It should be understood that the first transmitting branch, and the second transmitting branch may be used for more antenna elements.

In embodiments of the present disclosure, the first polarization and the second polarization may be orthogonal; and/or the first polarization and the second polarization may be the same.

Particularly, for the reception (Rx) channel, the first polarization and the second polarization may be orthogonal, and for the transmission (Tx) channel, the first polarization and the second polarization may be the orthogonal.

Embodiments of the present disclosure further provides an antenna array. The antenna array may comprise a plurality of antenna elements, and the feeding structure for antenna array according to any of embodiments described above.

In embodiments of the present disclosure, the antenna array comprises a plurality of subarrays each with 4×1 antenna elements.

In embodiments of the present disclosure, wherein the antenna array comprises a plurality of subarrays each with 5×1 or 6×1 antenna elements.

It should be understood, subarrays with any other number of antenna elements may also utilize the feeding structure of the embodiments of the present disclosure.

Embodiments of the present disclosure further provides a network node. The network node may comprise the antenna array according to any of embodiments described above. The network node may be any kind of base station.

As an example to be improved, in current 32 Tx/Rx platform, both Tx channels and Rx channels use the 4×1 subarray. The phase tuning density at Tx and Rx are both "¼". In such 32 Tx/Rx platform, the upper-SLS ratio needs to be improved.

In embodiments of the present disclosure, the Tx channels see 2×1 sub-subarray and report phase tuning density of "½". The Rx sees 4×1 subarray and reports phase tuning density of "¼". Arrays with phase tuning density of "½" reports better upper-SLS ratio when comparing with arrays with phase tuning density of "¼".

In such example, modifying the Tx phase tuning density from "¼" to "½" improves the features such as the upper-SLS ratio.

According to embodiments of the present disclosure, since the upper-SLS is only affected when transmitting (Tx), an asymmetric phase tuning density schematic is introduced for Tx and Rx. For Tx, the phase tuning density is increased to reduce the sidelobe level and increase the upper-SLS ratio. Particularly, the phase tuning density has been doubled. For Rx, the phase tuning density can be kept as same as a current design, and do not intervene the receiving schematic of current platform (such as a 32Tx/Rx platform).

The embodiments of the present disclosure may provide further specific advantages as following.

(1) The conflict between antenna gain and upper-SLS ratio issue (such as, for a 32Tx/Rx 128AE platform) can be solved, avoiding the use of Mechanical RET (Remote Electronic Tilt).

For example, a beam pointing/response speed of 32 Tx/Rx platform with proposed feeding structure may be similar with a current 64 Tx/Rx platform with proposed feeding structure. Such feature cannot be achieved by any existing RET, neither by continuously adjustable RET by mechanical drive nor by electronic RET with 4 gears.

(2) By implementing the Asymmetric transmission schematic over Tx and Rx, the side lobe level can be reduced and the upper-SLS ratio can be increased to satisfy the requirement.

(3) The EIRP (equivalent isotropic radiated power) can be increased for those cases with beam swept to large angle in vertical plane.

(4) Real-time vertical-beam tilting can be supported when comparing with the RET solution. RET is another solution for the conflict between antenna gain and upper-SLS ratio issue but cannot deliver real-time vertical beam sweeping.

(5) Higher gain can be realized when comparing with the RET solution, since RET solution has to suffer an inevitable insertion loss introduced by phase shifters at transmitting (Tx) branches.

Figure 7:
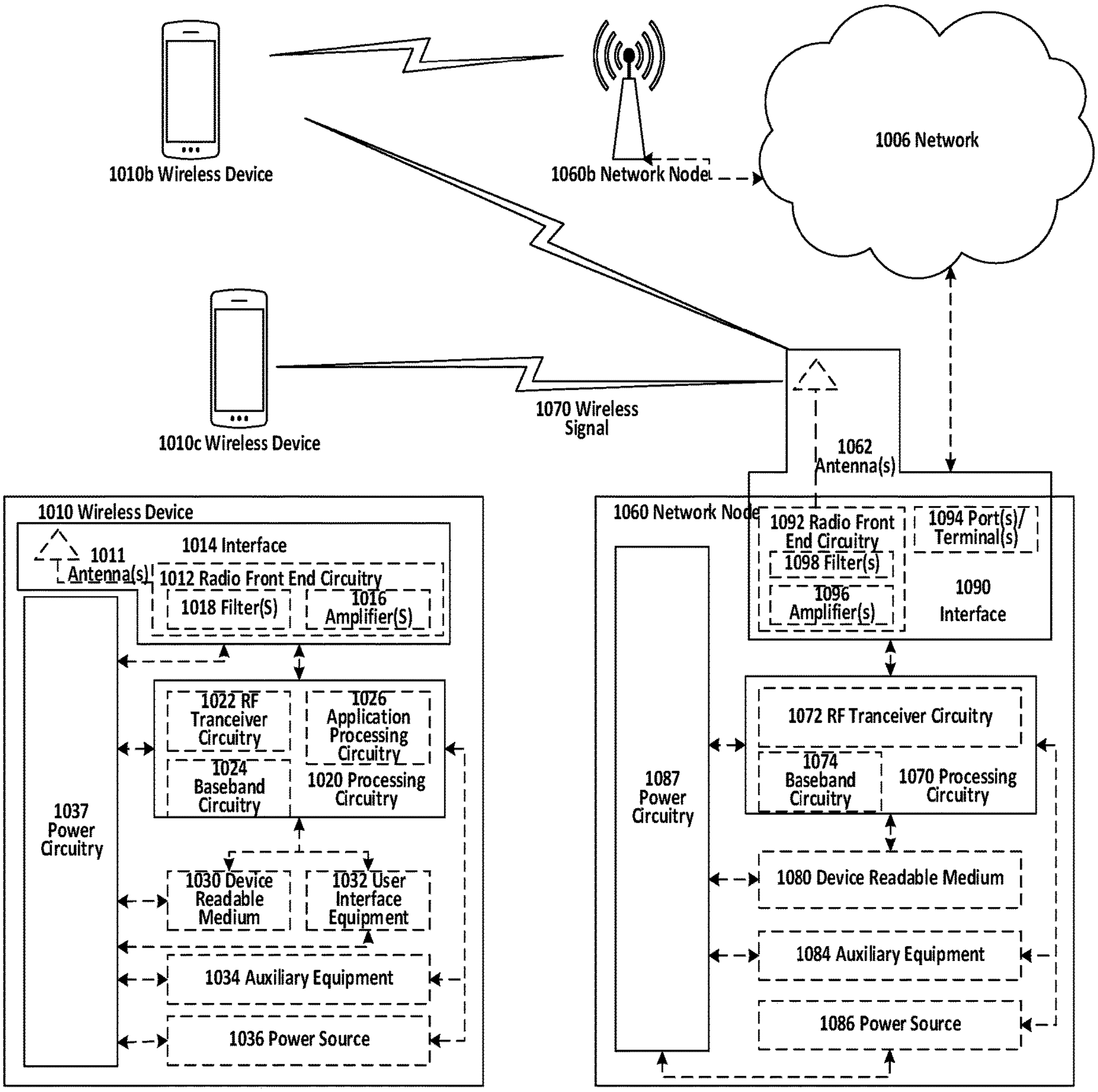
FIG. 7 is a schematic showing a wireless network in accordance with some embodiments.

FIG. 7 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 1006, network nodes 1060 and 1060*b* (e.g. corresponding to the network node), and WDs 1010, 1010*b*, and 1010*c* (e.g. corresponding to a terminal device). In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 1060 includes processing circuitry 1070, device readable medium 1080, interface 1090, auxiliary equipment 1084, power source 1086, power circuitry 1087, and antenna 1062 (with feeding structure according to embodiments of the present disclosure). Although network node 1060 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and an RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to transmit and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to transmit and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 7 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to transmit and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc.

The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

| Abbreviation | Explanation |
|---|---|
| AE | Antenna Element |
| Tx | transmitting |
| Rx | receiving |
| upper-SLS | upper-side-lobe-suppression |
| RET | remote electronic tilt |

The invention claimed is:

1. A feeding structure for an antenna array, the antenna array including a plurality of subarrays each with at least one antenna element, the feeding structure comprising:

at least one transmitting branch for a subarray of the plurality of subarrays;

at least one receiving branch for the subarray of the plurality of subarrays;

a first transmitting port;

a first transmitting branch coupled from the first transmitting port; and a second transmitting branch coupled from the first transmitting port, wherein the first transmitting branch is coupled to a first polarization part of a first antenna element to excite a first polarization from the first antenna element, and is coupled to a first polarization part of a second antenna element to excite the first polarization from the second antenna element, wherein the second transmitting branch is coupled to a second polarization part of the first antenna element to excite a second polarization from the first antenna element, and is coupled to a second polarization part of the second antenna element to excite the second polarization from the second antenna element, wherein the first polarization from the first antenna element and the second polarization from the first antenna element are combined to form a third polarization of the first antenna element, and the first polarization from the second antenna element and the second polarization from the second antenna element are combined to form a third polarization of the second antenna element, and wherein the at least one transmitting branch and the at least one receiving branch are arranged separately.

2. The feeding structure for the antenna array of claim 1, further comprising:

a first receiving branch coupled from the first polarization part of the first antenna element, and the first polarization part of the second antenna element; and a second receiving branch coupled from the second polarization part of the first antenna element, the second polarization part of the second antenna element, wherein, as to receiving, the first antenna element and the second antenna element are bipolarization antenna elements.

3. The feeding structure for the antenna array of claim 2, wherein a first circulator is coupled between the first transmitting branch, the first receiving branch, and first polarization parts of the first and second antenna elements; and wherein a second circulator is coupled between the second transmitting branch, the second receiving branch, and second polarization parts of the first and second antenna elements.

4. The feeding structure the for antenna array of claim 3, wherein the first polarization and the second polarization are orthogonal, and/or wherein the first polarization and the second polarization are the same.

5. The feeding structure for the antenna array of claim 3, further comprising:

a second transmitting port;

a third transmitting branch coupled from the second transmitting port; and a fourth transmitting branch coupled from the second transmitting port, wherein the third transmitting branch is coupled to a first polarization part of a third antenna element to excite a first polarization from the third antenna element is coupled to a first polarization part of a fourth antenna element to excite a first polarization from the fourth antenna element, wherein the fourth transmitting branch is coupled to a second polarization part of the third antenna element to excite a second polarization from the third antenna element, and is coupled to a second polarization part of the fourth antenna element to excite a second polarization from the fourth antenna element, and wherein the first polarization from the third antenna element and the second polarization from the third antenna element are combined to form a third polarization of the third antenna element, and the first polarization from the fourth antenna element and the second polarization from the fourth antenna element are combined to form a third polarization of the fourth antenna element.

6. The feeding structure for the antenna array of claim 2, further comprising:

a second transmitting port, a third transmitting branch coupled from the second transmitting port; and a fourth transmitting branch coupled from the second transmitting port, wherein the third transmitting branch is coupled to a first polarization part of a third antenna element to excite a first polarization from the third antenna element, is coupled to a first polarization part of a fourth antenna element to excite a first polarization from the fourth antenna element, wherein the fourth transmitting branch is coupled to a second polarization part of the third antenna element to excite a second polarization from the third antenna element, and is coupled to a second polarization part of the fourth antenna element to excite a second polarization from the fourth antenna element, and wherein the first polarization from the third antenna element and the second polarization from the third antenna element are combined to form a third polarization of the third antenna element, and the first polarization from the fourth antenna element and the second polarization from the fourth antenna element are combined to form a third polarization of the fourth antenna element.

7. The feeding structure for the antenna array of claim 6, further comprising:

a third receiving branch coupled from the first polarization part of the third antenna element, and the first polarization part of the fourth antenna element; and a fourth receiving branch coupled from the second polarization part of the third antenna element, and the second polarization part of the fourth antenna element, wherein, as to receiving, the third antenna element and the fourth antenna element are bipolarization antenna elements.

8. The feeding structure for the antenna array of claim 7, wherein a third circulator is coupled between the third transmitting branch, the third receiving branch, and first polarization parts of the third and fourth antenna elements; and wherein a fourth circulator is coupled between the fourth transmitting branch, the fourth receiving branch, and second polarization parts of the third and fourth antenna elements.

9. The feeding structure for the antenna array of claim 8, wherein the first receiving branch and the third receiving branch are coupled to a first receiving port, and wherein the second receiving branch and the fourth receiving branch are coupled to a second receiving port.

10. The feeding structure the for antenna array of claim 6, wherein the first polarization and the second polarization are orthogonal, and/or wherein the first polarization and the second polarization are the same.

11. The feeding structure for the antenna array of claim 2, wherein a first phase shifter is arranged in the first receiving branch, and wherein a second phase shifter is arranged in the second receiving branch.

12. The feeding structure for the antenna array of claim 2, wherein the first polarization and the second polarization are orthogonal, and/or wherein the first polarization and the second polarization are the same.

13. The feeding structure for the antenna array of claim 1, wherein the first transmitting branch is further coupled to a first polarization part of a fifth antenna element to excite the first polarization from the fifth antenna element; and wherein the second transmitting branch is further coupled to a second polarization part of the fifth antenna element to excite the second polarization from the fifth antenna element.

14. The feeding structure for the antenna array of claim 1, wherein the first polarization and the second polarization are orthogonal, and/or wherein the first polarization and the second polarization are the same.

15. An antenna array, comprising:

a plurality of subarrays each with at least one antenna element; and a feeding structure including:

at least one transmitting branch and at least one receiving branch for a subarray of the plurality of subarrays, the at least one transmitting branch and the at least one receiving branch being arranged separately;

a first transmitting port;

a first transmitting branch coupled from the first transmitting port; and a second transmitting branch coupled from the first transmitting port, wherein the first transmitting branch is coupled to a first polarization part of a first antenna element to excite a first polarization from the first antenna element, and is coupled to a first polarization part of a second antenna element to excite the first polarization from the second antenna element, wherein the second transmitting branch is coupled to a second polarization part of the first antenna element to excite a second polarization from the first antenna element, and is coupled to a second polarization part of the second antenna element to excite the second polarization from the second antenna element, and wherein the first polarization from the first antenna element and the second polarization from the first antenna element are combined to form a third polarization of the first antenna element, and the first polarization from the second antenna element and the second polarization from the second antenna element are combined to form a third polarization of the second antenna element.

16. The antenna array of claim 15, wherein the antenna array comprises a plurality of subarrays each with 4×1 antenna elements.

17. The antenna array of claim 15, wherein the antenna array comprises a plurality of subarrays each with 5×1 or 6×1 antenna elements.

18. The antenna array of claim 15, wherein the feeding structure further comprising:

a first receiving branch coupled from the first polarization part of the first antenna element, and the first polarization part of the second antenna element; and a second receiving branch coupled from the second polarization part of the first antenna element, the second polarization part of the second antenna element, wherein, as to receiving, the first antenna element and the second antenna element are bipolarization antenna elements.

19. A network node, comprising:

an antenna array including a plurality of subarrays each with at least one antenna element; and a feeding structure including:

at least one transmitting branch and at least one receiving branch for a subarray of the plurality of subarrays, the at least one transmitting branch and the at least one receiving branch being arranged separately;

a first transmitting port;

a first transmitting branch coupled from the first transmitting port; and a second transmitting branch coupled from the first transmitting port, wherein the first transmitting branch is coupled to a first polarization part of a first antenna element to excite a first polarization from the first antenna element, and is coupled to a first polarization part of a second antenna element to excite the first polarization from the second antenna element, wherein the second transmitting branch is coupled to a second polarization part of the first antenna element to excite a second polarization from the first antenna element, and is coupled to a second polarization part of the second antenna element to excite the second polarization from the second antenna element, and wherein the first polarization from the first antenna element and the second polarization from the first antenna element are combined to form a third polarization of the first antenna element, and the first polarization from the second antenna element and the second polarization from the second antenna element are combined to form a third polarization of the second antenna element.

20. The network node of claim 19, wherein the feeding structure further comprising:

a first receiving branch coupled from the first polarization part of the first antenna element, and the first polarization part of the second antenna element; and a second receiving branch coupled from the second polarization part of the first antenna element, the second polarization part of the second antenna element, wherein, as to receiving, the first antenna element and the second antenna element are bipolarization antenna elements.

* * * * *